US006570488B2

(12) United States Patent
Kucharczyk et al.

(10) Patent No.: US 6,570,488 B2
(45) **Date of Patent: *May 27, 2003**

(54) LOCKING MECHANISM FOR USE WITH ONE-TIME ACCESS CODE

(75) Inventors: David Kucharczyk, Santa Fe, NM (US); Suzy Brown, Menlo Park, CA (US)

(73) Assignee: Vistant Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/917,499

(22) Filed: Jul. 27, 2001

(65) Prior Publication Data

US 2002/0067261 A1 Jun. 6, 2002

Related U.S. Application Data

(63) Continuation of application No. 09/557,076, filed on Apr. 21, 2000, now Pat. No. 6,300,873.
(60) Provisional application No. 60/154,294, filed on Sep. 16, 1999.

(51) Int. Cl.[7] ................................................ G05B 19/00
(52) U.S. Cl. ......................... 340/5.2; 340/543; 713/182
(58) Field of Search ................................ 340/5.2, 5.21, 340/5.22, 5.26, 5.28, 5.51, 5.52, 5.54, 5.7, 5.9, 539, 542, 543; 713/182–184; 705/64, 72, 75

(56) References Cited

U.S. PATENT DOCUMENTS 3,911,397 A * 10/1975 Freeny, Jr. ................. 340/5.25
4,204,635 A 5/1980 Hofmann et al.
5,140,317 A 8/1992 Hyatt, Jr. et al. .......... 340/5.25
5,397,884 A 3/1995 Saliga ..................... 235/385.5
5,606,615 A * 2/1997 Lapointe et al. ............ 713/185
5,673,034 A 9/1997 Saliga ....................... 340/5.26
5,774,053 A 6/1998 Porter ..................... 340/568.1
5,936,221 A 8/1999 Corder et al. ............... 235/380
5,946,660 A 8/1999 McCarty et al.
5,979,750 A 11/1999 Kindell
6,218,955 B1 * 4/2001 Conklin ..................... 340/5.61
6,300,873 B1 * 10/2001 Kucharczyk et al. .... 340/568.1

FOREIGN PATENT DOCUMENTS

DE 29807184 U1 9/1998
EP 0821518 A2 1/1998
EP 0821518 A3 5/1999
GB 1474667 5/1977

OTHER PUBLICATIONS

Internation Search Report dated Jan. 23, 2002 (PCT/US01/40588).

* cited by examiner

*Primary Examiner*—Thomas Mullen
(74) *Attorney, Agent, or Firm*—Blakely Sokoloff, Taylor & Zafman LLP

(57) ABSTRACT

A request for an access code for a locking mechanism is received; and a one-time use access code for the locking mechanism is subsequently issued. The one-time use access code may be issued from a list of currently available access codes for the locking mechanism in response to a request therefor, for example by a merchant or delivery service. Such a code may be issued by a server, which server is further responsible for updating the list of available access codes in response to an indication that a code has been used or has otherwise expired. The list of currently available access codes is preferably a subset of all access codes for the locking mechanism, which codes may be generated using a cryptographically strong random number generator.

64 Claims, 6 Drawing Sheets

LOCKING MECHANISM FOR USE WITH ONE-TIME ACCESS CODE

RELATED APPLICATION

This application is a continuation of application Ser. No. 09/557,076, entitled "A System for Secure Unattended Delivery and Pickup of Goods" filed Apr. 21, 2000, now U.S. Pat. No. 6,300,873, which application is related to and hereby claims the priority benefit of a Provisional Application entitled "A System for Secure Unattended Delivery and Pickup of Goods", application Ser. No. 60/154,294, filed Sep. 16, 1999, by the present inventors.

FIELD OF THE INVENTION

The present invention relates to a scheme for providing one-time use access codes for a lock mechanism as may be employed with secured doors to and/or from buildings, secured access points and/or containers, etc., including secure storage devices for the delivery and pickup of goods and/or other applications/appliances/mechanisms that require security.

BACKGROUND

U.S. Pat. No. 5,774,053, which is hereby incorporated by reference, describes a storage device for the delivery and pickup of goods. As recognized in that disclosure, home delivery of goods has become more and more popular with the rise of shopping over the Internet, by catalog, and so on. In addition to clothing, appliances, furniture, books and other materials previously available from catalogs and the like, the Internet has spawned e-shopping services for groceries and other items. Similarly, in many areas local merchants such as dry cleaners offer residential pickup and delivery services for their customers.

The storage device described in U.S. Pat. No. 5,774,053 provided a means for such home pickups and deliveries even when the homeowner was absent. Briefly, the storage device provided a secure environment for the goods and included a communication apparatus for providing notification that the goods had been picked up or delivered. Access to the storage device was gained by entering a so-called vendor code into a controller via a keypad. The controller oversees locking/unlocking of the storage device. Entering a valid vendor code unlocks the storage device, allowing couriers and/or others to pickup and/or deliver goods from/to the storage device.

One shortcoming with the storage device described by U.S. Pat. No. 5,774,053 concerns the use of the vendor codes. As contemplated, the vendor codes are static, reusable codes assigned to each vendor that delivers and/or picks up goods to/from the storage device. "For example, a laundry and drycleaning (sic) business may be assigned a vendor code of 333, whereas a local grocery store may be assigned a vendor code of 444." U.S. Pat. No. 5,774,053 at col. 5, 11. 39–45. The use of such vendor codes presents a security risk in that once an unauthorized person learns one of the codes, that individual has access to the storage device until such time as the code is removed from the list of authorized vendor codes stored in the controller's memory. This presents a problem inasmuch as several days or weeks may pass before a storage box owner learns that one or more of the vendor codes has been compromised and has time to reprogram the controller with new vendor codes. During this time, the security of the storage box is questionable at best. Moreover, the assigning, canceling and reassigning of the vendor codes requires what could be a significant amount of time and effort (key management) on the part of a storage device owner/end-user. Also, the vendors are required to keep track of codes for different customers and, presumably, must take steps to ensure that the security of these codes are maintained.

SUMMARY OF THE INVENTION

Described herein is a scheme for providing locking mechanisms (that may be used in a variety of applications) for use with one-time access codes. The present scheme avoids the drawbacks of the system described above, for example by providing a third-party service that handles key management. The third-party service may issue access codes to vendors, etc., for one-time use and thereby free the storage device owners from having to perform and manage this task. Also, because the access codes are intended for one-time use only, vendors and others are freed from the responsibility of maintaining the security of a number of keys for different customers for indefinite periods. Keys (or access codes) may be distributed to the locking mechanism in a variety of ways (including via a RF network and/or at the time of manufacture).

In one embodiment, a request for an access code for a locking mechanism is received; and a one-time use access code for the locking mechanism is subsequently issued. The one-time use access code may be issued from a list of currently available access codes for the locking mechanism in response to a request therefor, for example by a merchant or delivery service. Such a code may be issued by a server, which server is further responsible for updating the list of available access codes in response to an indication that a code has been issued, used or has otherwise expired. The list of currently available access codes is preferably a subset of all access codes for the locking mechanism, which codes may be generated using a cryptographically strong random number generator. Such a locking mechanism may be used with a storage device, a door or gate, or any appliance or other mechanism or may find application in a variety of security systems.

In a further embodiment, a storage device that includes an enclosure adapted to allow for the storage of goods and having a door fitted with a locking mechanism; and a locking mechanism controller coupled to the locking mechanism and adapted to unlock the locking mechanism upon receipt of an entry code, said entry code expiring within a first predetermined time interval of its first use to unlock the locking mechanism (which may include some time after the locking mechanism has been re-locked), is provided. The entry code may expire within a second predetermined time interval (or, in other cases, a time window that varies, e.g., according to past usage of the locking mechanism) regardless of whether it is used to unlock the locking mechanism or not. The locking mechanism controller preferably includes a microcontroller configured to operate an actuator in response to receiving the entry code and may be adapted to receive the entry code via at least one of a keypad, a bar code scanner, a magnetic stripe reader, a wireless (e.g., RF or IR receiver) or a smart card reader. In some cases, the locking mechanism controller may be configured to communicate with a server (e.g., via at least one of the Internet, a wireless network or the public switched telephone network) configured to provide the entry code.

In a further embodiment, a computer-based service configured to dispense one-time use access codes for remotely located locking devices in response to requests therefor is provided. Transaction fees may be assessed for each access code dispensed and the access codes may be so dispensed from a server accessible through at least one of the Internet, a wireless network or the public switched telephone network. Preferably, each access code so dispensed expires upon the earlier occurrence of (i) its use to access an associated one of the storage devices, or (ii) a predetermined time period.

These and other features and advantages of the present invention are discussed in detail below.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

A locking mechanism adapted for use with one-time use access codes (and schemes for requesting/delivering such codes) as well as their use with various storage devices are described below. Although discussed with reference to certain illustrated embodiments, upon review of this specification, those of ordinary skill in the art will recognize that the present invention may find application in a variety of systems. Therefore, in the following description the illustrated embodiments should be regarded as exemplary only and should not be deemed to be limiting in scope.

In one embodiment, the present system allows for the secure delivery and/or pickup of goods, thereby increasing the efficiency of courier personnel by providing means for unattended pickup/delivery. In addition, means for verifying such delivery/pickup are incorporated within the system. One embodiment of the present system is composed of storage devices (adapted to be placed at locations where pickup/delivery services are desired, e.g., residences, office buildings, condominium and/or apartment developments, etc.), one or more computer servers, communications devices, human interface components and software. Features of the system include package tracking, electronic signatures, payment transfer, delivery scheduling, unattended transfer/storage of parcels and event notification to multiple parties. In addition, the present system allows for confirmation of deliveries/access to the storage device as well as confirmation of acceptance of the items delivered. As will be more fully described below, a unique one-time access code to allow access to a locking mechanism associated with a storage device is issued by a server for each access, pickup or delivery, thus reducing opportunities for theft and/or tampering and providing for the tracking of each access.

The present scheme also allows for goods and other materials to be picked up and delivered in a secure, traceable fashion. Physical security is provided in part by securing the storage device at the customer premises. This can be accomplished by fixing the storage device to the site with bolts or other fastening devices passed through reinforced points inside the body of the storage device and attaching same to a wall or floor. Alternatively or in addition, a water bladder/tank inside the storage device may be filled to add weight (and thus discourage unauthorized persons from attempting to move the storage device) and also acts to stabilize the temperature inside the storage device during the course of the day. The tank walls may be positioned several inches from the exterior of the storage device, thus preventing draining of the tank by puncturing the exterior of the storage device. In addition, a cable or chain may be used to secure the storage device at the site via an attachment point.

Figure 1:
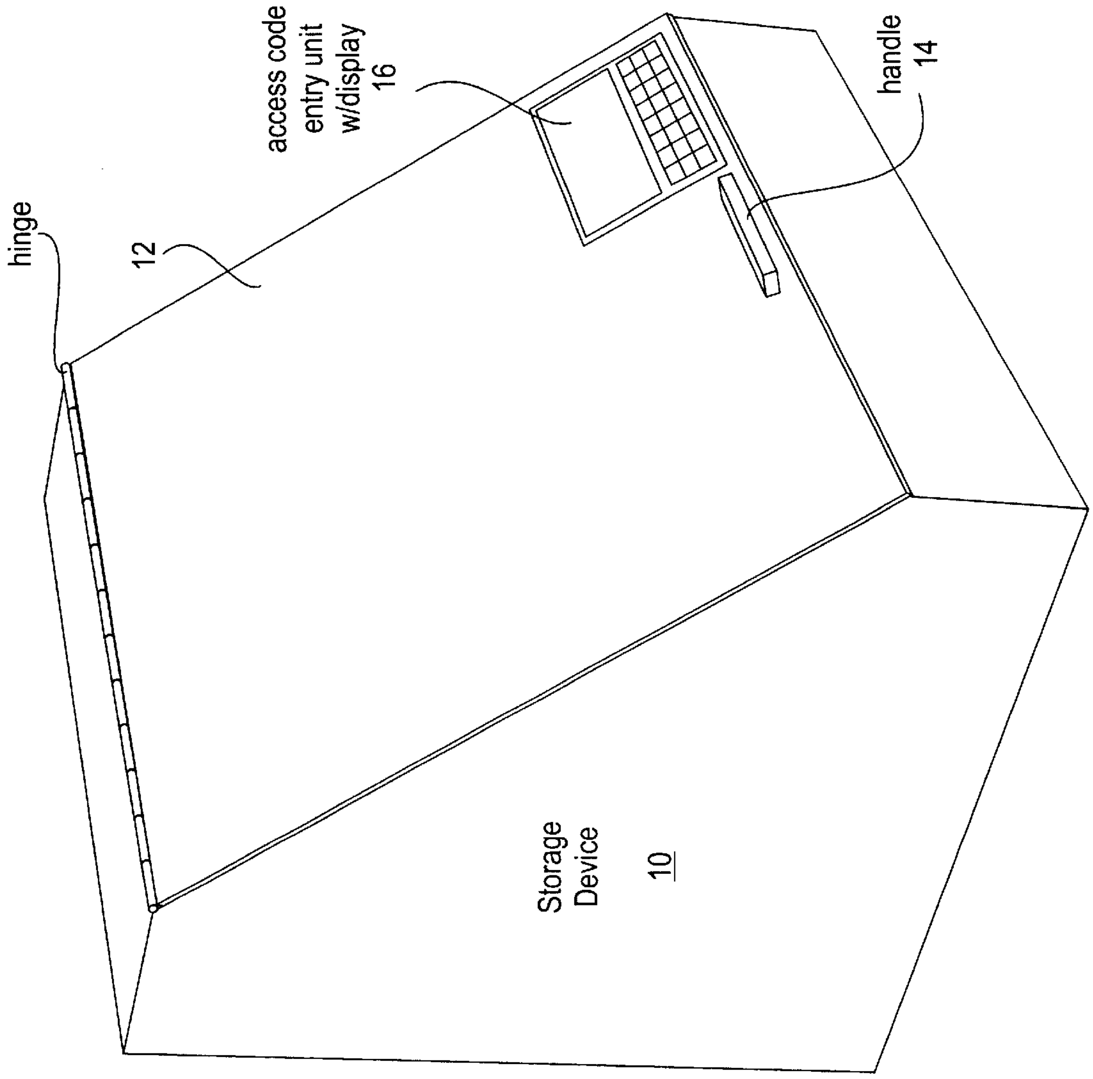
FIG. 1 illustrates an example of a storage device configured in accordance with an embodiment of the present invention.

An example of such a storage device fitted with a locking mechanism configured in accordance with the present invention is illustrated in FIG. 1. Storage device 10 has a generally rectangular base and is of a size sufficient to hold the type of goods that can be expected to be delivered. For example, storage device 10 may be of sufficient size to receive a delivery from a grocery store and/or other goods and/or the maximum or expected size of common courier deliveries. In the example shown in the figure, storage device 10 has a sloping lid 12 that extends from the rear of the storage device to the front thereof and which is hinged so as to open upwards and to the rear, but other embodiments of storage device 10 may be fitted with a door that opens to the side, front, bottom or top. A handle 14 is provided for user convenience in opening the lid 12, but other opening mechanisms (e.g., knobs, recessed handholds, etc.) may also be used. The physical design/size of storage device 10 is not critical to the present invention.

As shown, storage device 10 is configured with a locking mechanism that may be activated/deactivated via an access code entry unit 16. In one embodiment, access code entry unit 16 includes a keypad and display (useful for displaying messages such as the time and/or date of the last access and/or the identity of the person making such access based on the code used, etc.), and is configured to accept user input in the form of keystrokes and to provide user feedback and other human interface elements via a liquid crystal or other display. In other embodiments, the access code entry unit may operate in conjunction with an infrared transmitter (similar to an automobile keyless entry system), a barcode scanner and/or a magnetic stripe or electronic card reader. The infrared transmitter may be used by the owner of the storage device 10 to gain entry to the storage device without the need to manually enter an access code. In such cases, the infrared transmitter may be configured to emit a coded message upon activation, which message serves to authenticate the user and cause the access code entry unit (fitted with a corresponding infrared receiver) to unlock the locking mechanism. Similarly, a card with a magnetic stripe (coded with the user's access code) may be used to open the storage device 10, where the access code entry unit 16 is fitted with a magnetic stripe reader. An electronic card (e.g., fitted with a smart chip or other means of transmitting an access code) may also be used in place of or in addition to these other access means. Indeed, any or all of these access means may be employed in combination.

One other access means concerns the use of bar code scanners. A bar code is a combination of black and white lines that contains character information. The character information in bar codes may be read with specialized reading devices and subsequently passed on to a computer or other device (e.g. cash registers and other appliances). Various types of reading devices are used to obtain the data represented in bar codes, depending upon the application. One type of reading device that is used is a scanner. Scanners are generally equipped with laser diodes and a system of mirrors and lenses to scan the bar code and capture the reflection thereof. Other bar code reading devices that operate on similar principles include gun readers, light pens, cameras, etc.

In one embodiment, a specially configured bar code scanner (or other bar code reader) is adapted to modulate the laser beam produced by its laser diode, so as to transmit an access code. A bar code entry unit is positioned on storage device 10 (e.g., in place of or in addition to access code entry unit 16) and is configured to pass the access code information included in the modulated laser beam to a computer/controller unit of the access code entry unit. In this way, access code information may be passed to the storage unit at the same time as bar code information (e.g., a serial number or the like) is read therefrom.

Figure 2:
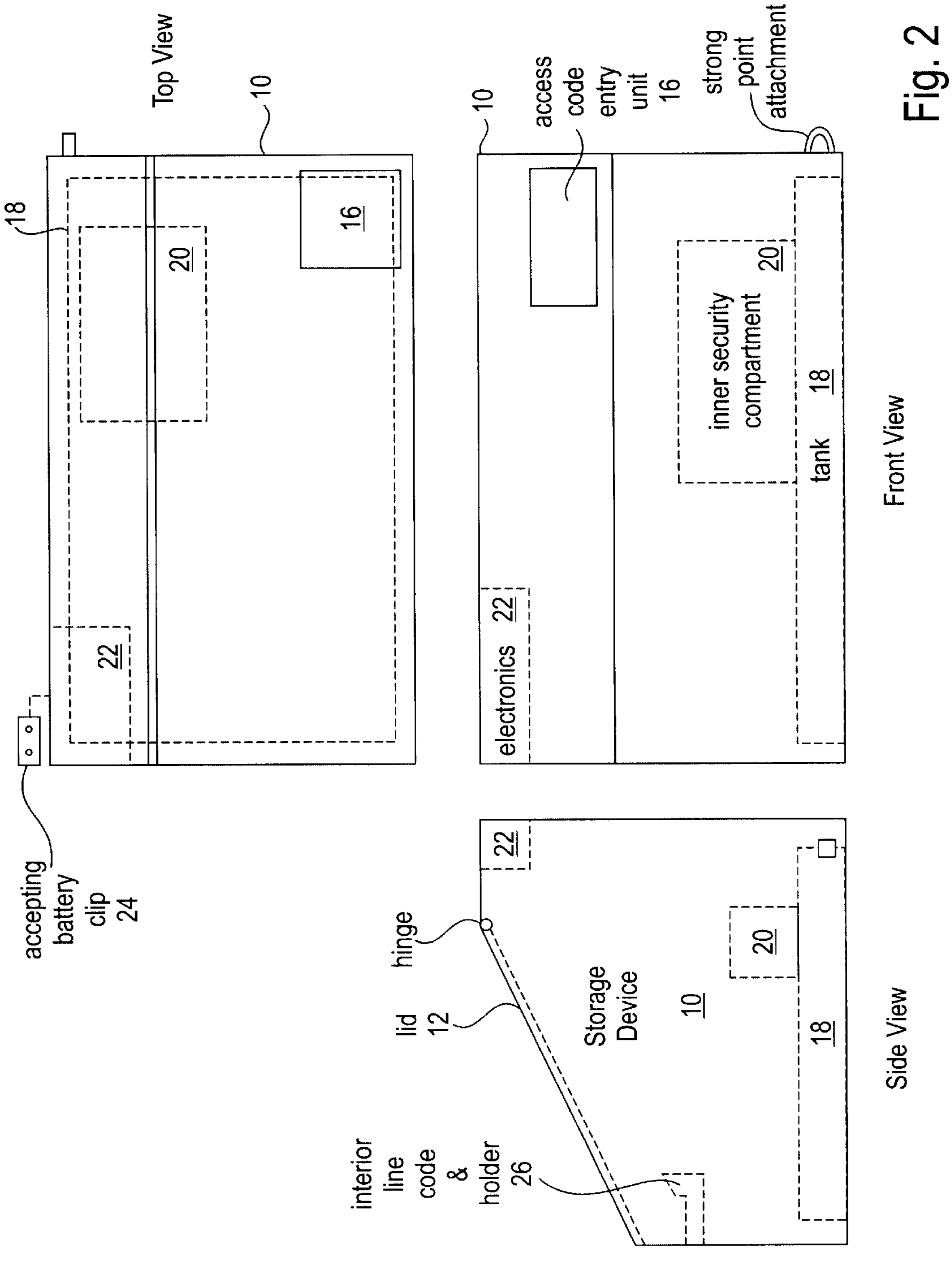
FIG. 2 illustrates top, front and side views of the storage device shown in FIG. 1.

FIG. 2 illustrates front, side and top views of the storage device 10, with certain features thereof not illustrated so as not to unnecessarily obscure other features of interest in the following discussion. Shown in broken line outline is the tank 18, which is located at the bottom of the interior portion of storage device 10 and which can be filled with water, sand or other material or fluid as described above. Also shown in broken line outline is an inner security compartment 20, which is located inside and secured to storage device 10. The inner security compartment 20 provides a secure "box within a box", and may be opened using a separate access control mechanism that that which opens storage device 10. For example, inner security compartment 20 may be fitted with a conventional key lock, a pad lock, combination lock or an electronic locking mechanism that relies on access codes similar to that described below. Inner security compartment 20 provides a storage space for highly confidential and/or valuable materials (such as cash, jewelry, cameras, etc.). Owners of storage device 10 may use inner security compartment 20 as a secure holding place for cash or other payments for COD delivery items and/or to receive delivery of valuable materials which others should not have access to. For example, if the owner is expecting multiple deliveries on the same day, one of which requires a COD payment, the owner may leave the payment funds locked within the inner security compartment 20 and provide the means for gaining entry to that inner security compartment (e.g., the lock combination or electronic access code, etc.) only to the delivery person expected to make the COD delivery. Other delivery persons will not have access to the inner security compartment 20, because the access code for storage device 10 will not operate the locking mechanism for the inner security compartment. In this way, the owner can ensure that only the desired delivery person (or other courier, neighbor, etc.) can have access to the contents of the inner security compartment 20. Storage device 10 also includes an electronic component bay 22, which may house the various electronic components of the locking mechanism described below. The power source (e.g., battery) for these components may also be located herein, and/or an external battery clip 24 may be provided. Preferably, the external battery clip 24 is only used to connect an external battery when the primary power source for storage device 10 has failed. In such situations, it is desirable that the power failure mode of the locking mechanism is the locked state. That way, in the event of a power (e.g., internal battery) failure, the storage device remains locked, until an external battery is applied to the battery clip 24 and the proper access code entered. Although this may cause one or more delivery attempts to fail, it is deemed to be preferable to a situation where the storage device reverts to an unlocked state. The same electronics bay 22 may include electronic circuitry and/or power sources for the inner storage compartment 20, or such electronics and/or power sources may be separate.

In one embodiment, the interior of storage device 10 includes a bar code unit 26 (shown in the side view only for clarity). The bar code unit 26 (which in some case may simply be a label glued or otherwise applied to the interior of the storage device 10 or in other cases may be a more durable bar code unit supported by a holder) provides a serial number or other identifying criteria for the storage unit 10. Thus, when delivery personnel that require some form of signature for dropping off a delivery leave a package in storage device 10, the bar code embossed on the bar code unit 26 can be read (e.g., using a conventional bar code scanner or other reader device) as a form of "digital signature". In some cases, the signature information may later be downloaded from the delivery service to the access code service provider (as described below) to confirm delivery and to acknowledge use of the access code.

Figure 3:
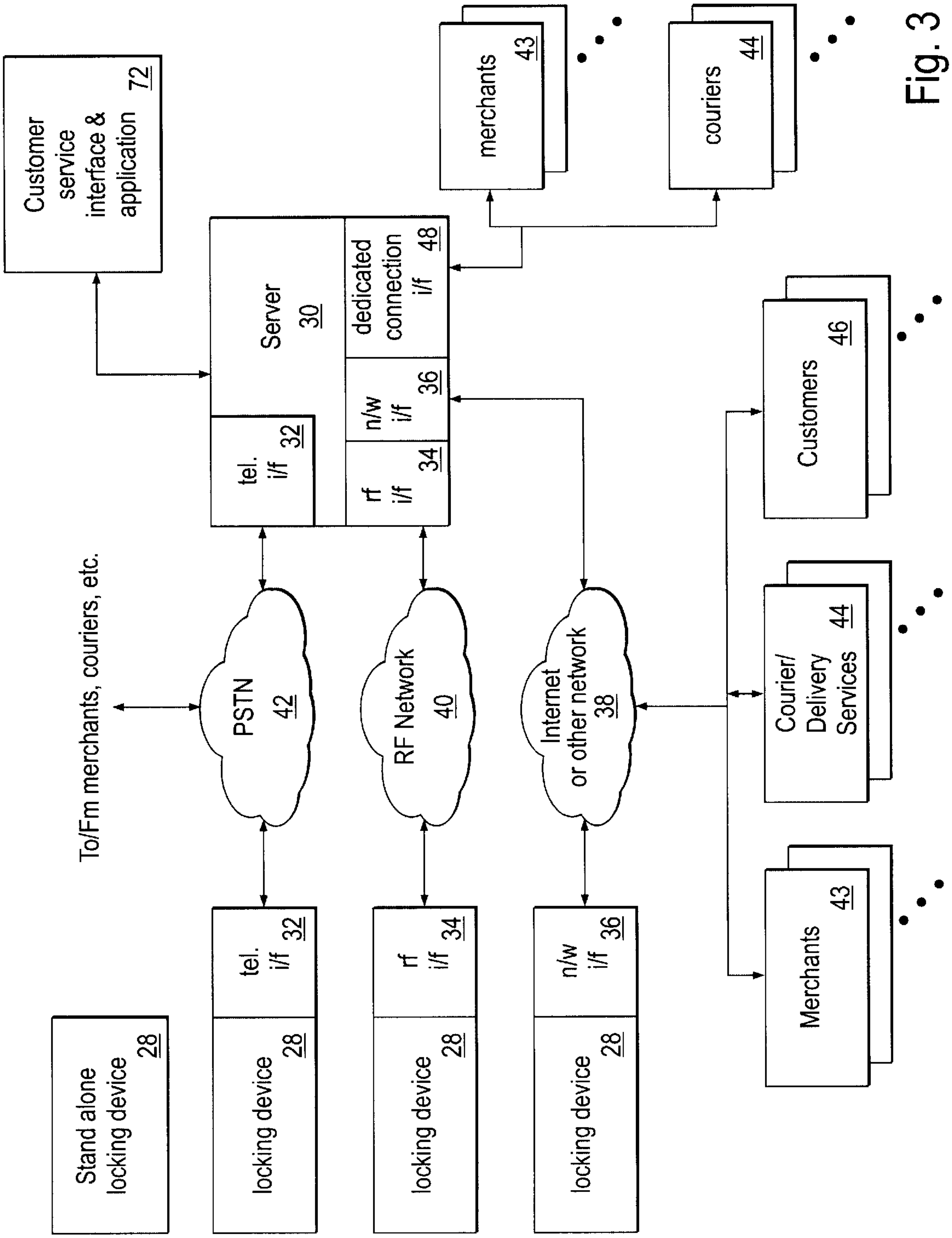
FIG. 3 illustrates a computer network configured to accept requests for and issue access codes for storage devices similar to that shown in FIG. 1.

FIG. 3 illustrates an embodiment of the present invention wherein a server (accessible through a number of means) is responsible for providing delivery personnel, merchants, customers and others with access codes for storage devices 10. Server 30 may be operated by a service provider that licenses, sells, leases, or otherwise provides locking devices 28 (e.g., for use with storage devices 10 or for other applications) to users thereof. As shown, locking devices 28 may be configured in a variety of ways: as stand-alone devices, or as connected devices, which communicate with server 30 via telephone interfaces 32, wireless (RF) interfaces 34 and/or network interfaces 36. The network interfaces 36 may be dedicated or dial up interfaces/connections that utilize a public computer network (such as the Internet 38) or a private computer network (such as a wide area network or virtual private network that tunnels within a public network). The RF interfaces may support communication within a public (e.g., cellular) or private wireless network 40. Telephone interfaces 32 may be adapted to provide communication with server 30 through the public switched telephone network (PSTN) 42 (e.g., via dial-up modem connection or Internet connection via Digital Subscriber Line, cable/wireless modem, etc.). Corresponding interfaces are provided at server 30 to allow for bidirectional, full-duplex and/or half-duplex communication with the locking devices 28.

Server 30 may also be accessed by various merchants 43, couriers/delivery services 44 and/or customer 46 through the Internet 38 or other means. For example, in some cases, one or more merchants 43 and/or couriers/delivery services 44 may maintain dedicated connections with server 30 through one or more dedicated interfaces 48. Thus, delivery services that experience a significant amount of interaction with owners of the storage boxes 10 may utilize such dedicated connections to request and receive access codes for locking devices 28 associated therewith, without having to establish individual connections through the Internet 38 for each transaction.

As alluded to above, one of the functions of server 30 is to provide access codes for the locking devices 28. In operation, owners (and herein the term owners is meant to encompass lessees, owners and others who have a locking device 28) of locking devices 28 will be able to instruct a delivery service, merchant, courier or other person or entity that any deliveries/pick ups for the owner should be made to/from the owner's storage device 10 that is configured with a locking device 28. For example, when shopping through an Internet-based merchant, when it comes time for the owner to indicate his/her delivery address, he/she may indicate the serial number or physical address (which need not necessarily be the owner's home address) of the storage box 10. By identifying the existence of the storage box in some way, the owner is prompting the merchant (or delivery service used by the merchant, etc.) to request an access code from server 30. The retrieval of such an access code may be completed as part of the checkout process from the Internet-based store, or it may be performed as a post-transaction function when the merchant behind the store processes the transaction. In other cases, when the storage box owner is expecting a delivery from a local merchant (e.g., a dry cleaning service or grocery delivery service, etc.), he/she may instruct the local merchant to request an access code from server 30 in order to deliver the goods to the storage box 10.

Regardless of how the delivery service/merchant is advised to request an access code that delivery service/merchant may access server 30 (either via the Internet 38 or through a dedicated connection, etc.) and request an access code by providing some identifying information about the subject locking device (and/or associated storage device, e.g., a serial number, owner's name and/or address, etc.). Recall that the access codes are meant to be one-time codes. That is, the codes are good for only one access to the locking device 28. Thus, every access code issued by server 30 for a particular locking device 28, will be unique to the requester. That requestor, and only that requester, will know the access code, and that access code will expire after it is used to open the subject locking device 28 (with reuse possible within a certain, short time interval in some cases). Therefore, not only does this minimize the risk of unauthorized access using an access code (because even if the once valid code were to be compromised it cannot be reused), it also allows tracking of which individuals/entities had valid access codes at a particular point in time.

Figure 4:
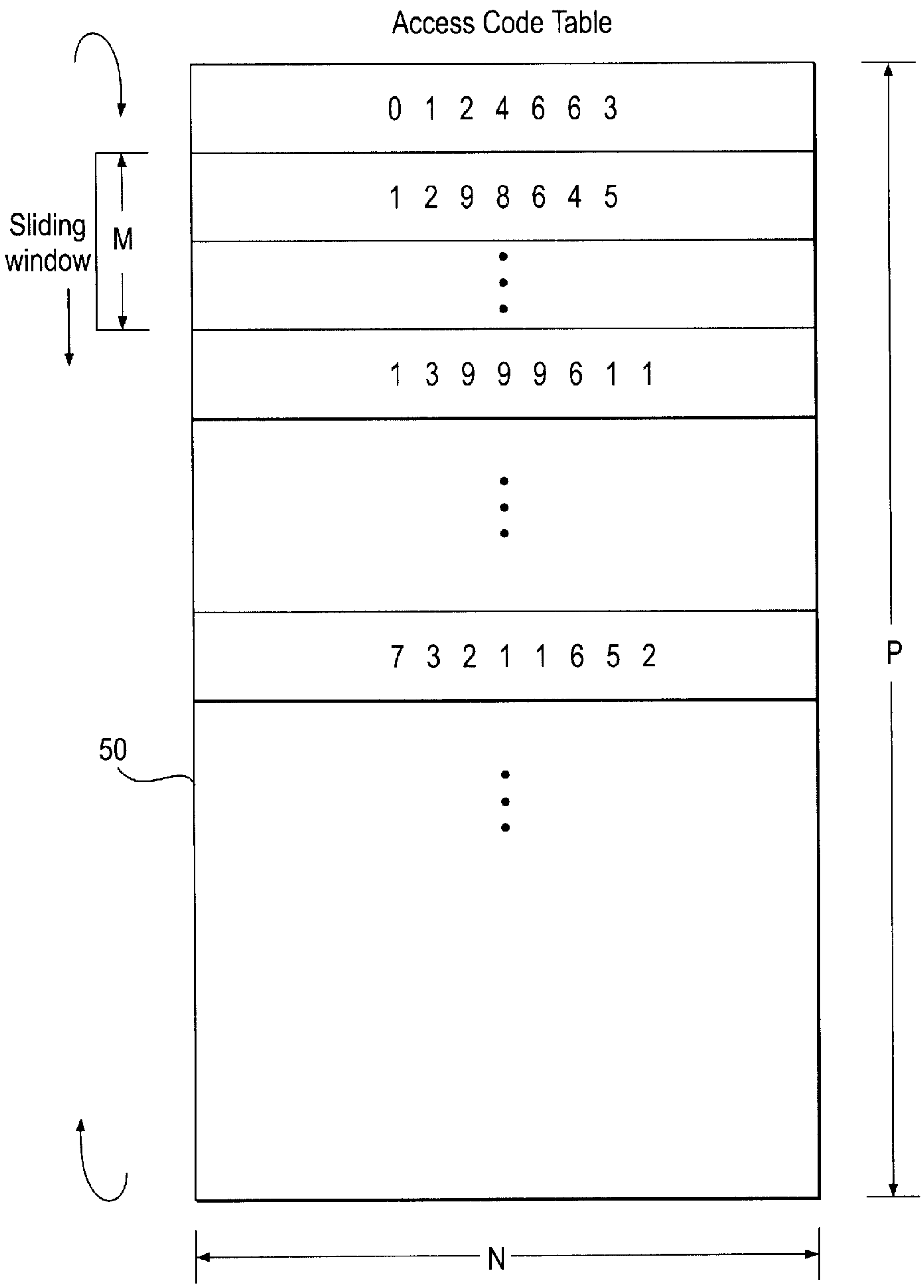
FIG. 4 illustrates an example of an access code table that may be maintained within a server and/or a storage device in accordance with an embodiment of the present invention.

The one-time access codes may be provided through the use of code books that are personalized for each locking device. For example, at the time each locking device (or its access code entry unit) is manufactured, a number of access codes may be stored in memory in a particular sequence. For example, the access codes may be stored in a table, similar to that shown in FIG. 4. Each access code may be N-digits long (e.g., 4–10 digits and in one embodiment 5–7 digits) and up to P (e.g., 1024–2048 or more) such access codes may be stored in a table 50 resident in memory (see below for a more detailed discussion of the access controller). These codes may be generated by a cryptographically strong random (e.g., pseudo-random) number (using a unique seed number for each individual locking device) generator at the time of manufacture and a replica of the access code table 50 for each locking device may be maintained at server 30 (e.g., as part of a customer database and/or a key database). Each time a delivery service, merchant and/or other person/entity requests an access code for a particular locking device, an unused code from the table for that locking device is selected and provided to the requester (preferably only after authenticating the identity of the requestor through the use of a previously assigned pass-code or the like).

In one embodiment, access codes for a locking device 28 are issued sequentially, and a new access code is not issued until the previously issued access code has been used. An indication of such use may be provided by communication between the locking device 28 and the server 30 (e.g., using one of the communication links discussed above) and/or by an indication from the delivery service/merchant/courier that the delivery/pick up has been completed. Also, the locking device owner may be responsible for providing an update to the server 30 indicating that a delivery or pick up was completed.

The sequential use of access codes in the manner discussed above provides very precise control over the access codes in as much as only one code is outstanding at any one time. However, it may be inconvenient inasmuch as a storage device owner may wish to receive several deliveries and/or schedule pick-ups that overlap with one another. To accommodate such situations, in another embodiment a number of access codes within a certain window of size M<<P may be issued, where the window need not necessarily include consecutive access codes. That is, to accommodate the need to issue multiple access codes within any given time frame, a window of size M is established. As requests for access codes are received, those access codes within window M are issued (e.g., sequentially, in round robin fashion, or in another fashion). As the access codes that have been issued are used and the server 30 is subsequently notified of such use, the window slides or is otherwise moved so as to indicate that the used code(s) has/have expired and to include new access codes. In other embodiments, the server 30 need not be notified of the access code use, rather such window movement may be based on time intervals, etc. In this way, the problem of overlapping deliveries/pick ups is rendered moot.

The size of the window may be configured by the storage box owner to accommodate his/her expected delivery/pick up frequency and can be altered at any time to account for especially busy times (such as near the holidays or prior to a special occasion when multiple deliveries can be expected). Alternatively, or in addition, the window size may be adjusted automatically based on use of the locking device. It is important, however, that the window sizes at the locking device 28 and server 30 be synchronized so that valid access codes are not rejected. So long as P is large enough, there should be sufficient time between reuse of any access codes so as to minimize the risk of compromise. Alternatively, once all the available access codes have been used, the locking device 28 may be reinitialized with a new set of access codes or the codes may simply be recycled (perhaps not in their original order of issue).

To account for situations where some codes are never used (e.g., cancelled deliveries and/or pickups), server 30 and locking device 28 can be configured to automatically cancel a particular access code after it has existed for some period of time (e.g., a few days or weeks or even just hours if so desired) within the window of valid codes. This use of a "time to live" for each access code prevents the window from becoming clogged with out-of-date codes that will never be used.

In still another embodiment, rather than having a table of available access codes, each locking device may be configured with a cryptographically strong random number generator as part of its access code entry unit. The numbers produced by the random number generator (with each new number so produced being used as a new seed number) may then be used as the access codes for that locking device. In such cases, server 30 would be configured with a similar random number generator and some knowledge of what a particular locking device's original seed number was. By knowing the seed number and the number of times the locking device has been accessed (e.g., the number of access codes given out), the server can predict what the next random number in the sequence produced by the random number generator at the locking device will be. This number can then be issued as the next access code for a requestor. Note that this scheme may present some of the problems discussed above for the overlapping delivery/pick up scenario, but may be suitable where the chance of such occurrences is small. To avoid such problems altogether (or at least to a greater degree), several (i.e., a window's worth) of access codes may be generated at a time and issued as needed. Of course, the corresponding access code entry unit would need to do the same so that codes within the window would be recognized.

Yet another way of distributing access codes is to use the server 30 to "push" such codes to the locking device 28. For example, a delivery service may already use unique tracking or other numbers for packages that are being delivered. Such tracking or other numbers could serve as access codes for the locking device where the delivery service notifies the server 30 of the tracking number and then server 30 transmits the tracking number to the locking device using one of the communication paths discussed above. The locking device 28 (or its associated access unit) may then store the tracking number in memory and allow its one-time use as a valid access code. Of course, such a scheme need not be limited to tracking numbers and any user-supplied access code could be used. Note that security precautions (such as password challenges, etc.) may need to be taken to ensure that such access codes are being provided by trusted sources. In this way, even user/owner PIN numbers could be uploaded to the locking devices.

Also, locking device owners may be able to notify server 30 of a valid access code by having the locking device itself upload the code to the server 30 through one of the above communication paths. The owner may set the code using the keypad or other interface associated with the access control unit and this code may then be supplied to server 30. Thus, the user may be able to provide an access code for an individual that does not have access to server 30. The idea of notifying server 30 of the user-specified code is to ensure that such code is not then reissued any time soon, so as to maintain the security of the locking device.

To this point, the use of server 30 as a means for requesting/delivering access codes has been discussed. Server 30 is also capable of operating as a central point of information dispersal. For example, storage device owners may be able to notify merchants and/or couriers that items are available for pick up through the use of server 30. By accessing server 30 (e.g., through the Internet or even by simply pressing a button or other notification mechanism at the storage device/access code entry unit), the owner may be able to complete a Web form (or send another notification message) that requests pick up of a specified item or items at a certain date/time and upon submission of that Web form server 30 may transmit an electronic mail (e-mail) message to the designated courier/merchant along with the necessary access codes.

Figure 5:
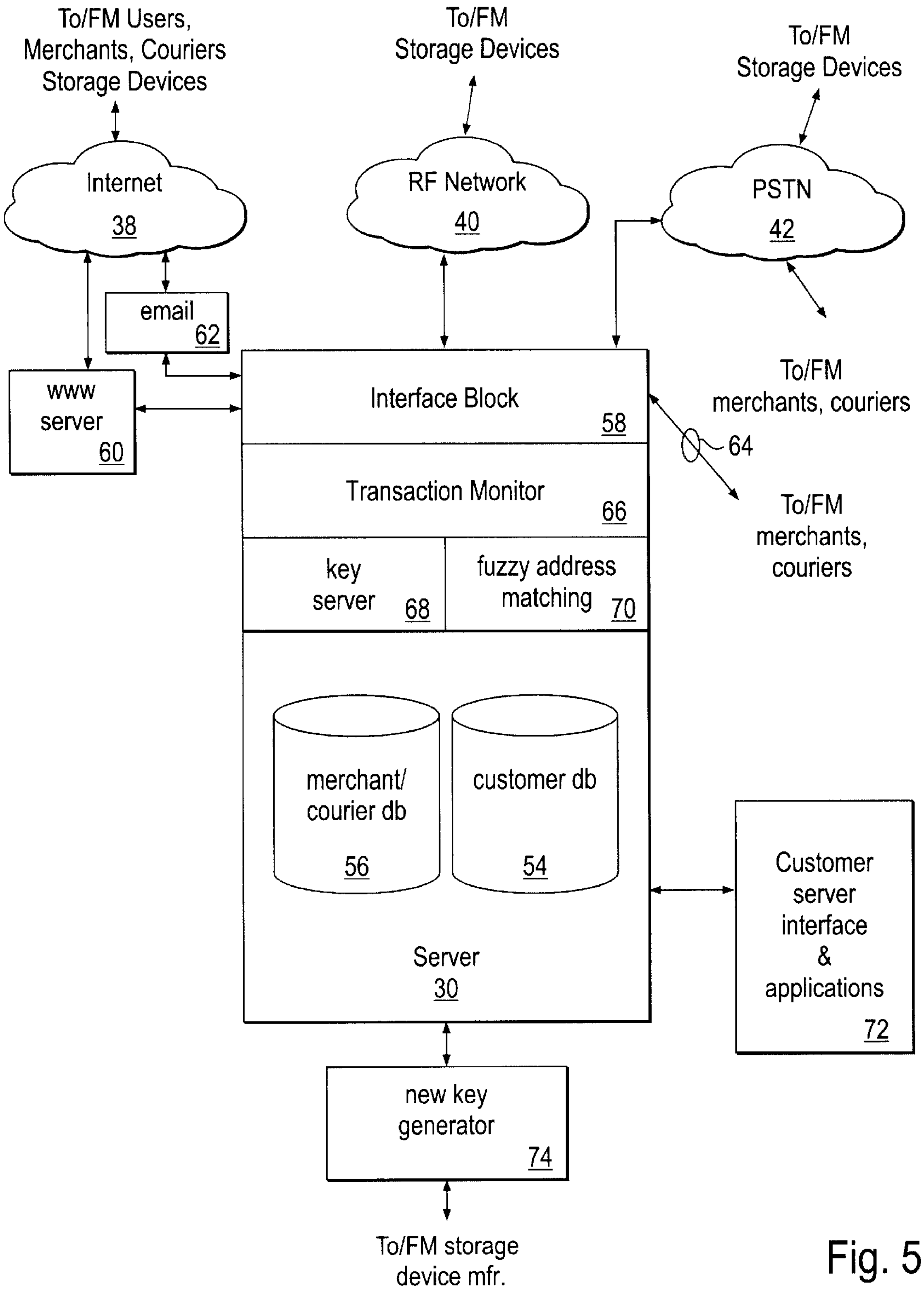
FIG. 5 illustrates a more detailed view of a server suitable for use with the network shown in FIG. 3.

The role of server 30 as an information aggregator is more fully discussed with reference to FIG. 5 (of course this is merely one example of a server architecture and many other variants thereof may be used). As shown, server 30 is configured with one or more databases, for example a customer database 54 and/or a merchant/courier database 56. An interface block 58 provides the interfaces for server 30 to the Internet 38 (e.g., via a Web server 60 and/or an e-mail engine 62), an RF network (e.g., a cellular or packet radio network) 40 and/or the PSTN 42. Direct connections 64 with merchants/couriers may also be accommodated through interface block 58.

A transaction monitor 66 is responsible for keeping track of incoming access code requests, verifying requesters (e.g., by comparing offered pass-codes with those stored in the customer and/or merchant courier databases), issuing access codes, receiving reports of used access codes and updating access code table information. The access code tables (where used) may be stored as part of customer database 54 and accessed through a key server 68 which is responsible for receiving and acknowledging access code requests (with or without the assistance of the transaction monitor 66). A fuzzy address matching block (e.g., algorithm) 70 may be provided to accommodate misspellings or other typographical errors when access code requests, etc. are made. For example, where an address is entered that has no corresponding match in the customer database 54, the fuzzy address matching block 70 may be configured to run alternate queries with slightly different spellings of the submitted address to see if any matches are found. If such matches are found, server 30 may respond with a question such as "Did you mean . . . ?" In this way, merchants and other seeking access codes for their clients' storage devices will not be turned away blindly, perhaps causing missed deliveries or general customer dissatisfaction with the service.

A customer service interface and application block 72 may be provided to allow new customers to sign up and request delivery of locking devices and/or update their address information, etc. This also provides a data entry interface for various merchants/couriers, etc. that want to enter/update their information in the relevant databases. Further, this may include applications that allow for remote programming of the access code entry unit and/or locking device so that keypad features thereof may be updated/modified.

Another component associated with server 30 is the new key generation block 74. In this block (which may be a software component of server 30 or a dedicated computer system), the access code tables for new storage devices may be generated and copies thereof provided to the server 30 (e.g., for inclusion in the customer database 54) and/or the storage device fabrication facility (e.g., for inclusion within the new storage devices). Matching of storage device serial number (or other identifying criteria) and access code table is important otherwise it may not be possible to gain entry to a storage device.

Figure 6:
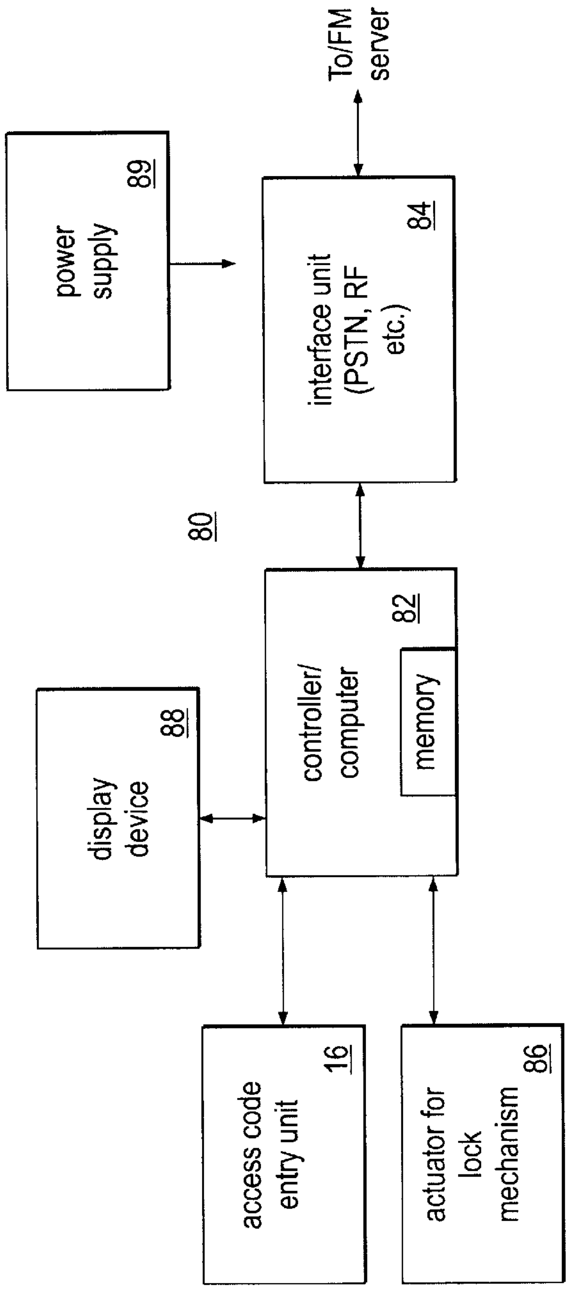
FIG. 6 illustrates an example of a locking mechanism controller for the storage device shown in FIG. 1.

FIG. 6 now illustrates an example of an access code controller 80 for a locking device 28, portions of which may be housed in the electronics bay 22 of storage device 10 described above. A central component of the access code controller 80 is a micro-controller/computer 82. In some embodiments, this micro-controller/computer may be a general-purpose microprocessor with associated volatile and non-volatile memory. The non-volatile memory may be programmed with an operating system and various subroutines for the microprocessor to provide the needed functionality and may also store the access code table for the locking device where such a table is used. An interface unit 84 may be provided for intercommunication with server 30 (where the storage device operates in other than a stand-alone mode) and this interface unit may allow for communication via the Internet, the PSTN and/or an RF or other network. This interface unit may also be configured to accept access codes from an owner-operated remote control as described above.

The micro-controller/computer 82 is configured to accept inputs (e.g., access codes) from the access code entry unit 16. As indicated above, these codes may be provided in a variety of format, such as keystrokes from a keypad, magnetic stripe reader and/or bar code scanner. Other access code entry devices may also be used. Upon entry of an access code, the micro-controller/computer may be programmed to compare the entered code with the available valid codes and, upon successful comparison issue a control signal to an actuator 86 to unlock the storage device. If the entered code does not match a valid code, a failure message may be displayed on a display device 88 (e.g., a liquid crystal or other display, which, in some cases, may be part of the access code entry unit 16). Where several failed attempts (e.g., 3) to gain access to the storage device occur in succession, the micro-controller/computer may be programmed to reject any further attempt to open the storage device until the owner enters a special reset or other code. In such cases, the micro-controller/computer may also be configured to report such attempted access to the server 30 for further investigation. Other deterrence mechanisms include prolonging the lock-out period between repeated access attempts.

A power supply 89 (e.g., a battery or some other power supply) is provided to power the electronic elements of access controller 80. As discussed above, means can be provided for alternate power supplies in the event of a power failure.

Storage device 10 and the one-time access-code scheme described above provide for some interesting business opportunities for the provider operating server 30 (hereinafter referred to as the "service provider"). For example, unlike the scheme described in U.S. Pat. No. 5,774,053, the present service provider is and remains part of the chain of commerce in every pick up and/or delivery from/to a storage box 10. This is an opportunity to realize revenue from the distribution of access codes, rather than merely from the distribution of storage devices. Because one can expect to distribute may more access codes than storage devices, it follows that the potential overall revenue to be realized from the present business model is greater than that which may be realized simply from distributing storage devices.

In addition, the service provider has the opportunity to act as a virtual escrow agent. Because the service provider can track the delivery of goods to the storage device (e.g., through the reporting back of the use of an access code in the fashion described above), the service provider can withhold payments to a merchant or other third party until such delivery can be confirmed. This is especially attractive in the area of Internet-based auction transactions, where both seller and buyer are reluctant to be the first to transmit goods or money as the case may be. By arranging for payment and delivery through the service provider (e.g., following the conclusion of an auction), each party is assured that funds will be transmitted upon delivery and not before (although the service provider cannot assure any quality of the goods so delivered).

Because the use of the storage device provides security, delivery services need not schedule deliveries around a customer's physical presence. Indeed, modified storage devices that are configured to provide refrigerated or heated compartments may be used so that perishables and other temperature-sensitive items may be delivered at any time into the storage box. This added convenience for the delivery service providers might be an incentive for such businesses to offer similar payment mechanisms through the present service provider as a way of attracting new customers. The present-service provider benefits by experiencing an increase in the number of access codes issued (presumably at a fee) for an increasing number of deployed storage devices.

Although the foregoing description and accompanying figures discuss and illustrate specific embodiments, it should be appreciated that the present invention has much broader applicability. For example, the locking device may be used with doors, gates (e.g., providing access to gated communities, condominium developments, apartment complexes, etc.) and other security systems. Such broader applications are all within the scope of the present invention. In addition, the storage device described above may be adapted for use as a secure mailbox by providing a mail delivery slot through a side or top of the storage device (similar to such delivery slots as may be found on the door of a house or building). Indeed, the storage device could be adapted to receive mail into the secure box within a box, so that delivery personal would not have access to the mail so delivered. Of course a conventional (or secure) mailbox could simply be attached to the exterior of another storage device.

Still other variations of the above-described scheme are possible. For example, the access codes themselves could be the tracking numbers (or other identifying criteria) assigned by the delivery service or merchant. Consider, for example, a situation where a storage device owner purchases certain goods form an on-line store and requests delivery. When the on-line merchant arranges for delivery of the goods, for example through a commercial delivery service, a tracking number for the package(s) is usually assigned. Either the merchant or the delivery service may than notify the server 30 of this tracking number and the server 30 may communicate (e.g., via the internet or through a wireless and/or wired link) with the access code controller 80 to inform the controller 80 that such tracking number is a valid access code. The controller 80 may store the tracking number in memory for later recall/comparison. Note, the storage device 10 may even be fitted with a bar code reader/scanner to allow a delivery person to scan in the tracking number from a bar code applied to the package being delivered, thus avoiding the need to manually enter the tracking number/access code.

Figure 7:
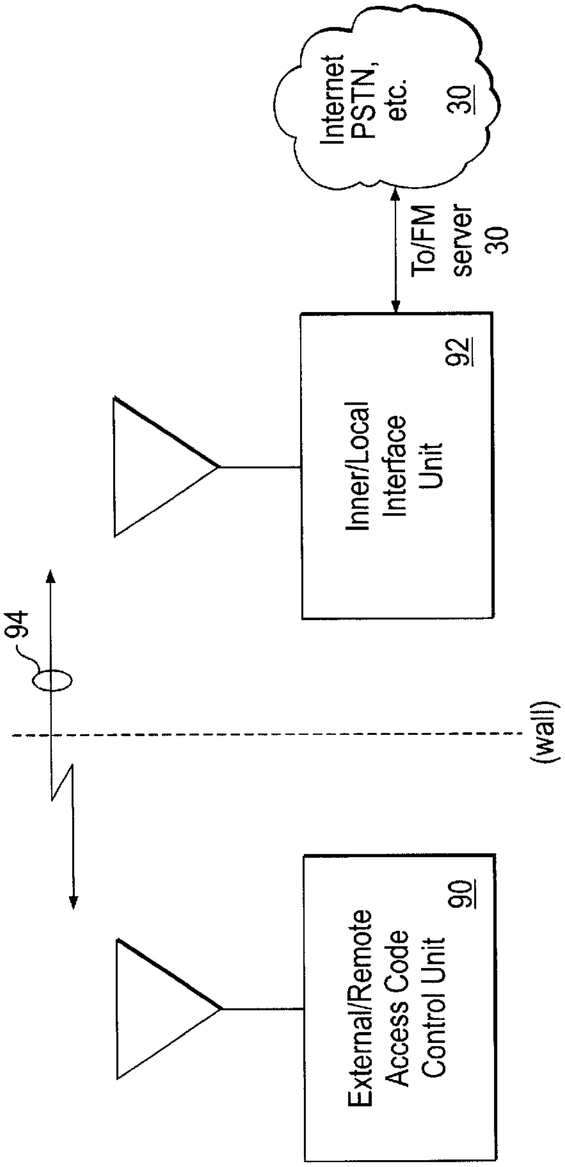
FIG. 7 illustrates an example of the use of a local interface unit as a relay station for messages passed between a remote access code control unit and a server.

Communication between the server 30 and the controller 80 may be accomplished in any of the above-described fashions or as follows. As shown in FIG. 7, one embodiment of the present invention provides an external/remote access code control unit 90 and an inner/local interface unit 92, which communicate with one another via a wireless (or in some cases a wired) communication link 94. The remote access code control unit 90 may be located some distance away from the local interface unit 92 and/or may be on the opposite side of one or more obstructions (e.g., a wall) therefrom. In one case, the remote access code control unit 90 may be co-located with a storage device outside a home, while the local interface unit 92 is located inside the home (e.g., near a telephone jack or connected to a personal computer or other appliance having an Internet connection).

In operation, messages to be passed between server 30 and remote access code control unit 90 may be relayed through local interface unit 92. For example, interface unit 92 may communicate with server 30 through a conventional Internet/PSTN connection (e.g., using a modem unit, etc.) and with remote access code control unit 90 through wireless (e.g., RF or IR) connection. Messages from remote access code control unit 90 may be downconverted, decoded, translated and/or packetized (e.g., according to conventional TCP/IP or other communication protocols) for transmission to server 30. Likewise, messages from server 30 may be depacketized, decoded, translated and/or upconverted for transmission to remote access code control unit 90 across communication link 94. Such a mechanism allows for the exchange of many different types of messages between the server 30 and the remote access code control unit 90, such as access codes, instructions to change window sizes, delivery/acceptance notifications, pick-up requests, payment authorization messages, etc.

In some cases, the local interface unit 92 may be configured with a notification unit to alert users that packages/goods have been delivered and/or picked up from a storage device associated with the remote access code control unit 90. For example, such a notification unit may be a conventional liquid crystal display, one or more light emitting diodes, and/or other indicators that signal the pick-up/delivery of items. The interface unit 92 may also be equipped with a keyboard or other man-machine interface to allow for user communication with server 30, for example to indicate that items are available for pickup or to request/set access codes, etc.

Returning now to FIG. 6, in some configurations of access code entry unit 16, the access code entry unit 16 may include means for accepting a biometric identification. Thus, finger/thumb print recognition units, retina recognition units, signature capture mechanisms (e.g., as are commonly used at point-of-sale terminals), and/or other means may be employed as access devices for the unit. In this way, users need not necessarily have to remember personal identification numbers (PINS) and/or use other remote access devices. Further, the access code entry unit 16 and/or controller 80 may be configured to accept special access codes to allow users to change their PIN, reset a window size and/or switch access code tables, and perform other customization/maintenance routines. Once such customization routine may be used to designate certain buttons of the access code entry unit 16 as specific function keys. For example, one or more keys may be designated to transmit messages to specific vendors/couriers (e.g., via e-mail or other messages through server 30), indicating that packages, etc. are ready for pick-up.

As mentioned briefly above, one of the advantages provided by the present invention concerns confirmation of delivery. Upon access by the delivery person, the controller 80 can be programmed to transmit a message to server 30 (e.g., using one of the above-described communication channels) that includes the access code used by the delivery person. Server 30 can compare this access code to those previously issued and (in addition to updating any code windows, etc.) can then relay a message (e.g., via e-mail, pager, facsimile or other means) to the storage device owner that not only indicates that a delivery has been made, but who/which organization made the delivery. In addition, upon user access to the storage device, similar notice can be given to server 30 and server 30 can, in turns send confirmation of receipt messages to any vendors/delivery services that had deposited packages in the storage device. This may be especially useful where the delivery service requires or relies upon a customer "signature" and the confirmation of receipt message can be used as a virtual signature or can even include a digital representation of the customer's actual signature for record keeping purposes.

Given the breadth of applications and variations for the above-described schemes then, the present invention should not be limited by the above-described examples but rather only measured in terms of the claims, which follows.

What is claimed is:

1. A method comprising:

receiving at a computer system and via the Internet a request for an access code for a locking mechanism; and issuing from the computer system an authorized access code for the locking mechanism, wherein the request includes the authorized access code to be issued.

2. The method of claim 1 wherein issuing comprises transmitting the authorized access code to the locking mechanism.

3. The method of claim 2 wherein the transmitting occurs at least in part, over a wireless communication network.

4. The method of claim 1 wherein the locking mechanism includes a keypad.

5. The method of claim 1 wherein the request is received from at least one of: a merchant, a delivery service, an owner of the locking mechanism, a user of the locking mechanism, or a homeowner.

6. The method of claim 1 wherein the authorized access code is selected from a list of possible access codes for the locking mechanism.

7. The method of claim 1 further comprising updating a computer-readable information source to reflect issuance of the authorized access code.

8. The method of claim 7 further comprising updating the computer-readable information source to reflect use of the authorized access code.

9. The method of claim 8 wherein the computer-readable information source comprises a database accessible by the computer system.

10. The method of claim 1 wherein the authorized access code is produced using a pseudo-random number generator.

11. A computer-based service configured to dispense access codes for remotely located locking devices in response to requests therefor, which access codes are wirelessly transmitted to the locking devices.

12. The computer-based service of claim 11 wherein the access codes are dispensed from a server which is accessible via the Internet.

13. The computer-based service of claim 12 wherein the server is further accessible to retrieve records of one or more of: access code disbursement, access code use and access code request.

14. The computer-based service of claim 11 wherein the locking devices are associated with storage devices accessible via keypad entry devices.

15. The computer-based service of claim 14 wherein the access codes are one-time use codes.

16. The computer-based service of claim 15 wherein the one-time use codes are generated using a pseudo-random number generator.

17. The computer-based service of claim 11 wherein the access codes are one-time use codes.

18. The computer-based service of claim 11 wherein the access codes expire after a predetermined time or event.

19. The computer-based service of claim 11 further comprising a notification service configured to provide messages indicating access to the locking devices.

20. The computer-based service of claim 19 wherein the messages comprises one or more of: e-mail messages, pager messages or facsimile messages.

21. The computer-based service of claim 20 wherein records of access to the locking devices are maintained for access via the Internet.

22. A computer system configured to receive a request for an access code to a locking mechanism via the Internet and to issue an authorized access code in response thereto, wherein the request includes a desired access code for use as the authorized access code.

23. The computer system of claim 22 wherein the authorized access code is issued to the locking mechanism via a wireless communication network.

24. The computer system of claim 23 wherein the locking mechanism is associated with a storage device.

25. The computer system of claim 23 wherein the locking mechanism includes a keypad.

26. The computer system of claim 22 further configured to provide records of one or more of: access code issuance or access code use.

27. The computer system of claim 22 wherein the authorized access code is a one-time use code.

28. The computer system of claim 27 wherein the one-time use code is produced by using a pseudo-random number generator.

29. The computer system of claim 22 being further configured to provide a notification message upon receipt of an indication that the locking mechanism has been accessed.

30. The computer system of claim 29 wherein the notification message comprises one or more of: an e-mail message, a pager message or a facsimile message.

31. The computer system of claim 22 wherein the authorized access code is valid only for a single use or a predetermined time period, whichever occurs or expires, as applicable, earlier.

32. A method comprising:

receiving at a computer system and via the Internet a request for an access code for a locking mechanism; and issuing from the computer system an authorized access code for the locking mechanism by transmitting the authorized access code to the locking mechanism.

33. The method of claim 32 wherein the transmitting occurs at least in part, over a wireless communication network.

34. The method of claim 32 wherein the locking mechanism includes a keypad.

35. The method of claim 32 wherein the request is received from at least one of: a merchant, a delivery service, an owner of the locking mechanism, a user of the locking mechanism, or a homeowner.

36. The method of claim 32 wherein the authorized access code is selected from a list of possible access codes for the locking mechanism.

37. The method of claim 32 further comprising updating a computer-readable information source to reflect issuance of the authorized access code.

38. The method of claim 37 further comprising updating the computer-readable information source to reflect use of the authorized access code.

39. The method of claim 38 wherein the computer-readable information source comprises a database accessible by the computer system.

40. The method of claim 32 wherein the authorized access code is produced using a pseudo-random number generator.

41. A method comprising:

receiving at a computer system and via the Internet a request for an access code for a locking mechanism;

issuing from the computer system an authorized access code for the locking mechanism; and updating a computer-readable information source to reflect issuance of the authorized access code.

42. The method of claim 41 further comprising updating the computer-readable information source to reflect use of the authorized access code.

43. The method of claim 42 wherein the computer-readable information source comprises a database accessible by the computer system.

44. The method of claim 42 wherein the authorized access code is produced using a pseudo-random number generator.

45. A method comprising:

receiving at a computer system and via the Internet a request for an access code for a locking mechanism;

issuing from the computer system an authorized access code for the locking mechanism; and wherein the authorized access code is produced using a pseudo-random number generator.

46. A computer system configured to receive a request for an access code to a locking mechanism via the Internet and to issue an authorized access code in response thereto, wherein the authorized access code is issued to the locking mechanism via a wireless communication network.

47. The computer system of claim 46 wherein the locking mechanism is associated with a storage device.

48. The computer system of claim 46 wherein the locking mechanism includes a keypad.

49. The computer system of claim 46 further configured to provide records of one or more of: access code issuance or access code use.

50. The computer system of claim 46 wherein the authorized access code is a one-time use code.

51. The computer system of claim 50 wherein the one-time use code is produced by using a pseudo-random number generator.

52. The computer system of claim 46 being further configured to provide a notification message upon receipt of an indication that the locking mechanism has been accessed.

53. The computer system of claim 52 wherein the notification message comprises one or more of: an e-mail message, a pager message or a facsimile message.

54. The computer system of claim 46 wherein the authorized access code is valid only for a single use or a predetermined time period, whichever occurs or expires, as applicable, earlier.

55. A computer system configured to receive a request for an access code to a locking mechanism via the Internet and to issue an authorized access code in response thereto, wherein the authorized access code is a one-time use code.

56. The computer system of claim 55 further configured to provide records of one or more of: access code issuance or access code use.

57. The computer system of claim 55 wherein the one-time use code is produced by using a pseudo-random number generator.

58. The computer system of claim 55 being further configured to provide a notification message upon receipt of an indication that the locking mechanism has been accessed.

59. The computer system of claim 58 wherein the notification message comprises one or more of: an e-mail message, a pager message or a facsimile message.

60. The computer system of claim 55 wherein the authorized access code is valid only for a single use or a predetermined time period, whichever occurs or expires, as applicable, earlier.

61. A computer system configured to receive a request for an access code to a locking mechanism via the Internet and to issue an authorized access code in response thereto, and to provide a notification message upon receipt of an indication that the locking mechanism has been accessed.

62. The computer system of claim 61 wherein the notification message comprises one or more of: an e-mail message, a pager message or a facsimile message.

63. The computer system of claim 61 wherein the authorized access code is valid only for a single use or a predetermined time period, whichever occurs or expires, as applicable, earlier.

64. A computer system configured to receive a request for an access code to a locking mechanism via the Internet and to issue an authorized access code in response thereto, wherein the authorized access code is valid only for a single use or a predetermined time period, whichever occurs or expires, as applicable, earlier.

* * * * *

UNITED STATES PATENT AND TRADEMARK OFFICE

CERTIFICATE OF CORRECTION

PATENT NO. : 6,570,488 B2
APPLICATION NO. : 09/917499
DATED : May 27, 2003
INVENTOR(S) : Kucharczyk et al.

It is certified that error appears in the above-identified patent and that said Letters Patent is hereby corrected as shown below:

Related Applications listing in Column 1

Lines 7 and 8 delete "A System for Secure Unattended Delivery and Pickup of Goods" and replace with "LOCKING MECHANISM FOR USE WITH ONE-TIME ACCESS CODE"

Signed and Sealed this
Twenty-first Day of February, 2012

David J. Kappos
*Director of the United States Patent and Trademark Office*